(12) United States Patent
Erlandsson

(10) Patent No.: US 10,111,522 B2
(45) Date of Patent: Oct. 30, 2018

(54) MOUNTING CLIP FOR ADJUSTABLE SHELF SYSTEMS

(71) Applicant: Hans Erlandsson, Sollentuna (SE)

(72) Inventor: Hans Erlandsson, Sollentuna (SE)

( * ) Notice: Subject to any disclaimer, the term of this patent is extended or adjusted under 35 U.S.C. 154(b) by 14 days.

(21) Appl. No.: 15/429,266

(22) Filed: Feb. 10, 2017

(65) Prior Publication Data

US 2017/0231384 A1 Aug. 17, 2017

(30) Foreign Application Priority Data

Feb. 11, 2016 (EE) .................................. 201600002

(51) Int. Cl.
| | |
|---|---|
| *A47B 57/42* | (2006.01) |
| *A47B 96/02* | (2006.01) |
| *A47B 96/06* | (2006.01) |
| *A47B 57/40* | (2006.01) |

(52) U.S. Cl.
CPC ............ *A47B 57/42* (2013.01); *A47B 96/027* (2013.01); *A47B 96/06* (2013.01); *A47B 96/061* (2013.01); *A47B 57/408* (2013.01)

(58) Field of Classification Search
CPC ....... A47B 57/42; A47B 96/06; A47B 96/027; A47B 96/061; A47B 57/408
USPC ........... 248/243, 248, 250; 108/48; 211/135, 211/186, 187, 193, 90.01, 90.02, 103, 211/126.5, 133.3
See application file for complete search history.

(56) References Cited

U.S. PATENT DOCUMENTS

| | | | |
|---|---|---|---|
| 836,045 A | 11/1903 | Melchior | |
| 977,609 A * | 12/1910 | Freeman | ................ A47B 57/42 |
| | | | 248/243 |
| 3,041,033 A * | 6/1962 | Schwartz | ............. A47B 96/061 |
| | | | 248/248 |
| 3,471,112 A * | 10/1969 | MacDonald | ......... A47B 96/063 |
| | | | 108/109 |
| 4,151,917 A | 5/1979 | Pugh | |
| 4,406,374 A * | 9/1983 | Yedor | .................... A47B 57/40 |
| | | | 211/192 |
| 6,109,461 A * | 8/2000 | Kluge | ................... A47B 57/30 |
| | | | 211/103 |
| 6,138,584 A * | 10/2000 | Waite | ................... A47B 96/028 |
| | | | 108/108 |
| 6,364,263 B1 | 4/2002 | Ryan | |
| 7,823,848 B2 | 11/2010 | Haarmann | |
| (Continued) | | | |

FOREIGN PATENT DOCUMENTS

| | | |
|---|---|---|
| EP | 0 390 045 A2 | 10/1990 |
| EP | 1 829 463 A1 | 9/2007 |
| (Continued) | | |

OTHER PUBLICATIONS

Estonia Search Report P201600002 dated Jul. 4, 2016.

*Primary Examiner* — Muhammad Ijaz
(74) *Attorney, Agent, or Firm* — Young & Thompson

(57) ABSTRACT

Disclosed is a mounting clip for adjustable shelf systems, which ensures reliable and durable fixing of adjustable shelf boards without leaving any screw holes or marks on the board and also provides a possibility to dismount shelf boards by being re-adjustable in the same or different location. The mounting clip automatically locks its position between the shelf board and upper part of the rail opening. When the clip reaches its final position the wings will pass through the opening and create a snap in fixation.

20 Claims, 7 Drawing Sheets

(56) References Cited

U.S. PATENT DOCUMENTS

Figure 1:
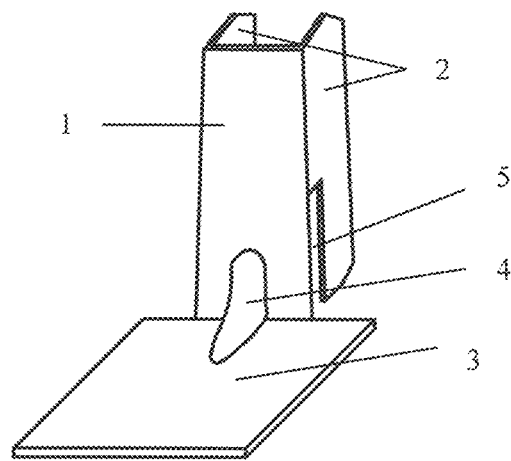

| | | | | |
|---|---|---|---|---|
| D786,053 S * | 5/2017 | Fabis | | D8/380 |
| 9,775,437 B2 * | 10/2017 | Stark, III | | A47B 96/061 |
| 2008/0217496 A1 * | 9/2008 | Wooten | | A47B 96/061 |
| | | | | 248/248 |
| 2012/0119043 A1 * | 5/2012 | Rataiczak, III | | A47B 96/061 |
| | | | | 248/218.4 |
| 2015/0335155 A1 | 11/2015 | Winker | | |
| 2016/0369943 A1 * | 12/2016 | Fabis | | E04B 1/7675 |
| 2018/0132611 A1 * | 5/2018 | Lu | | A47B 57/406 |

FOREIGN PATENT DOCUMENTS

| | | | | |
|---|---|---|---|---|
| GB | 414180 | | 8/1934 | |
| GB | 618669 | | 2/1949 | |
| GB | 618669 A | * | 2/1949 | ........... A47B 96/065 |
| GB | 2 182 842 A | | 5/1987 | |
| GB | 2194134 | | 3/1988 | |
| NL | 7607876 | | 1/1978 | |

* cited by examiner

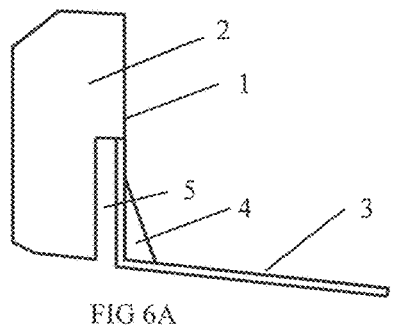
FIG 6A
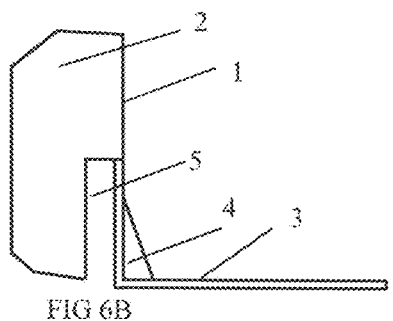
FIG 6B
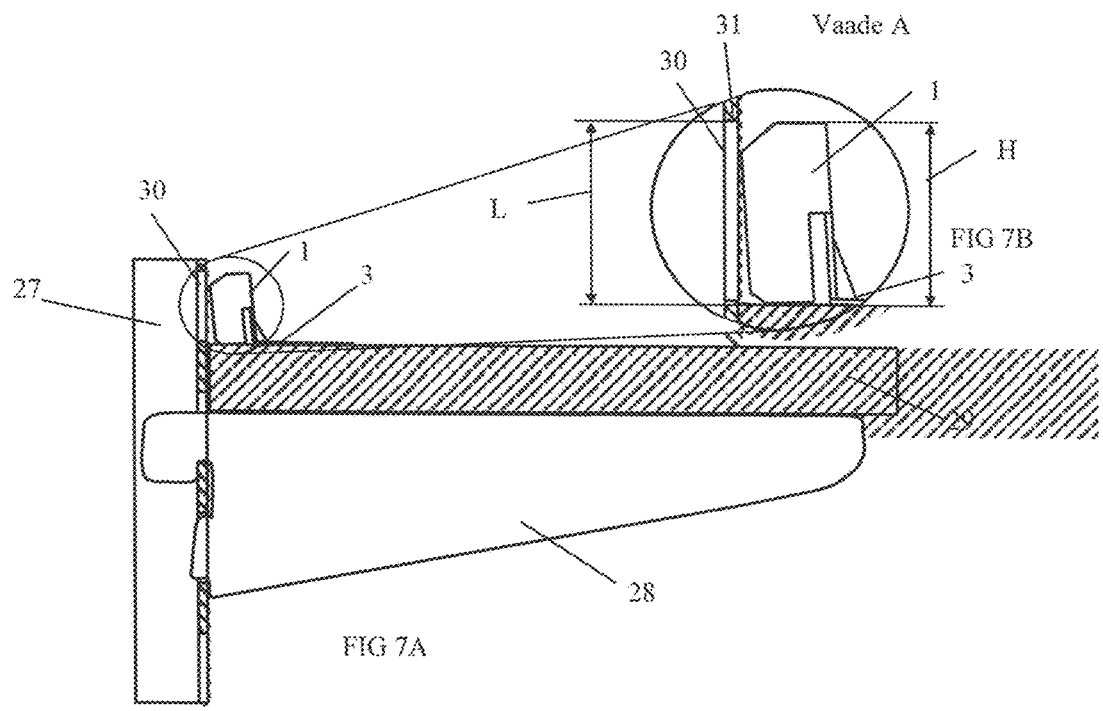
FIG 7A
FIG 7B

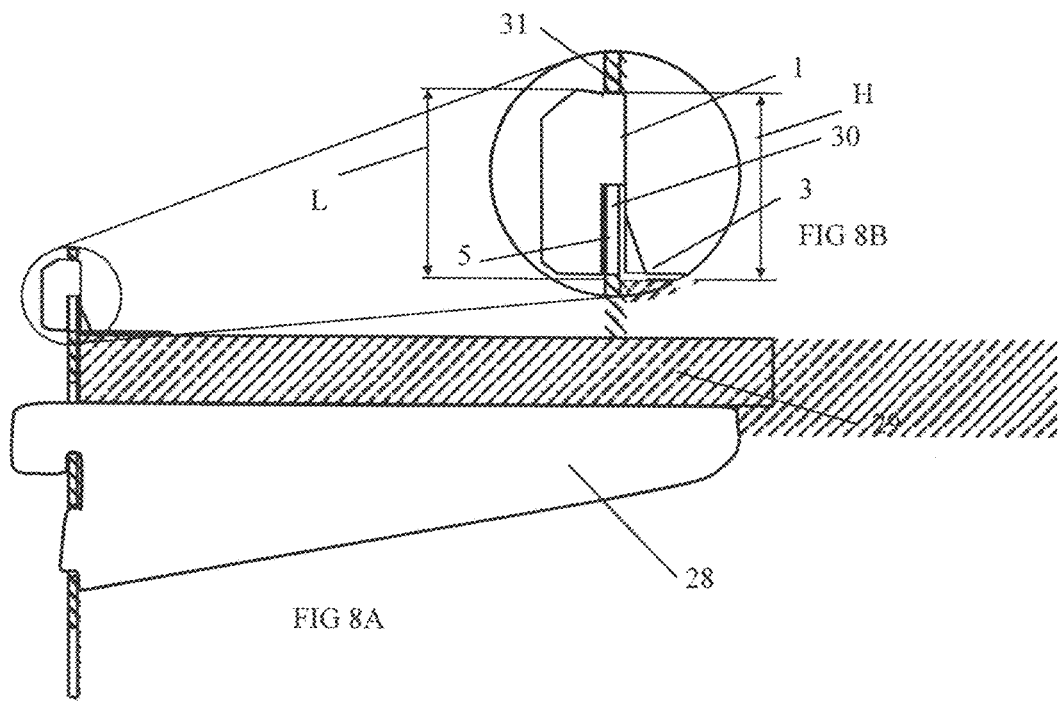
FIG 8A
FIG 8B
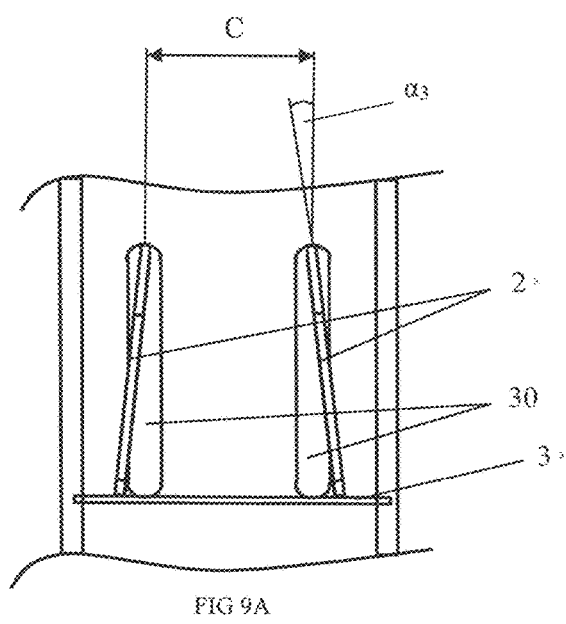
FIG 9A

MOUNTING CLIP FOR ADJUSTABLE SHELF SYSTEMS

TECHNICAL FIELD

The present disclosure is generally related to adjustable organizers for storage system. More specifically, the disclosure relates to adjustable shelf mounting systems.

PRIOR ART

Adjustable shelf systems are widely used today. The system normally consists of a rail with opening slots, also called wall band, which is usually fixed to the wall with screws. On the rails, a number of different objects may be attached. Brackets for holding shelves, different types of hangers for tools, clothes and so on. One of the major usages is the combination of bracket with hooks for mounting into the opening slots of the rail and melamine or wooden shelves that are placed on the brackets and fastened by screws. The standard thickness of the melamine shelve is typically 19 mm and is available at a number of different lengths and widths. Wooden shelves common shelve plate is typically 18 mm thick and is available at a number of different lengths and widths.

For fixing the shelve to brackets, screws are generally recommended. This is a secure and strong fixation if it is done properly. The problem occurring with using screws for fixing the shelves, and in particular melamine shelves, are that the screws need to be of the exact correct length and that two screws with different lengths are necessary for each type of bracket. Too long screws will penetrate the shelf board and too short screws will not fix the shelf board properly.

The melamine shelf board has a hard surface that protects it from wear. This hard surface is however a drawback when screwing the screws into the shelf boards. It is difficult to get an angular attachment and it requires considerable force to screw the screws. Incorrect mounting may result in bad fixation, which is not detectable. To ease the screwing and secure the positioning of the screws, a hole may be pre-drilled. This however demands a screwdriver, a drilling machine, a drill with the correct diameter and the ability to controlling the depth that is drilled.

In order to be able to readjust the height of the shelf on the rails, after the first mounting, the shelf board either needs to be unscrewed, which reduces the strength between screw and shelf board material or the shelf board need to be mounted at a distance from the wall allowing the shelf and the bracket to be tilted upwards before being removed from the rail and inserted in the new position. If the shelf board is placed too close to the rail, all screws need to be unscrewed to move the shelf and if it is placed too far away from the rail, the force applied on a screw will increase. The gap between the edge of the shelf and the wall also allows objects to fall down.

Due to its mounting difficulties it is common that the shelf board is just placed on the brackets without any further fixation. This works in the normal loading situation but is a personal hazard if load is applied on the outer edge of the shelf board, i.e. a load placed incorrectly or when a small child climbs and risks resulting in that the shelf board will tilt over.

Different brackets and bracket systems for adjustable shelf systems are also known, following are examples of these:

U.S. Pat. No. 6,364,263 discloses a shelf clip with upper shelf bracket and a lower shelf bracket defining a shelf space there between for the seating of a shelf.

EP1829463 discloses a shelf support with two part spacer elements, between which shelf plate can be fixed and EP0390045, GB2182842 disclose shelf-support brackets, between which lower and upper surface shelf board is fixed.

U.S. Pat. No. 6,138,584 discloses a shelf support comprising a support body with a support surface for supporting a shelf, which in use retains the shelf on the support surface.

BRIEF DESCRIPTION OF THE INVENTION

The invention provides a mounting clip for adjustable shelf systems, which does not require any further fixing with screws, provides reliable fixation and enables dismounting and re-adjusting the same shelf board without damaging it. The provided mounting clip fixes shelf board on a bracket, which in turn is fixed to shelf rail and the mounting clip automatically locks the shelf board in a fixed position on the bracket.

The mounting clip is mounted by positioning its' back wings through the openings of the shelf rail and by pushing the mounting clip inwards into locking position. The mounting clip automatically locks its position between the shelf board and upper part of the rail opening. The upper part of the mounting clip, which enters the opening, has an angle to secure fastening and the lower flat part of the clip has an angle to ease the mounting of the clip and applying a spring force to the shelf board. When the clip reaches its final position the wings will pass through the opening and create a snap in fixation.

Removing of the clip is most easily done through placing a pointy blunt instrument like a table knife or a screwdriver on the upper part between the rail and the clip and tilt the clip gently forward.

The mounting clip provided by the invention ensures reliable and durable fixing of adjustable shelf boards without leaving any screw holes or marks on the shelf board and also provides a possibility to dismount shelf boards by being re-adjustable in the same or different location. With the provided mounting clip, standard shelf plates and standard brackets for adjustable shelf systems can be used.

The fundamental idea of a described organizer system is that it is highly versatile, adjustable, and reconfigurable before, during, and after installation. The present invention enhances all these major criteria.

LIST OF THE DRAWINGS

Preferred embodiments of the invention are described with accompanying drawings, wherein the drawings represent following:

FIG. 1: Perspective view of shelf mounting clip
FIG. 2A: Frontal view of mounting clip with trapezoid shaped back part
FIG. 2B: Frontal view of mounting clip with alternative trapezoid shaped back part
FIG. 2C: Frontal view of mounting clip with alternative rectangular shaped back part
FIG. 3: Side view of mounting clip
FIG. 4A: Perspective view of mounting clip
FIG. 4B: Side view of mounting clip
FIG. 5A: Bottom view of mounting clip
FIG. 5B: Perspective view of mounting clip
FIG. 6A: Side view of mounting clip before mounting
FIG. 6B: Side view of mounting clip in mounted position FIG. 7A: Side view of shelf system before mounting of mounting clip in final position FIG. 7B: Enlargement of section in FIG. 7A FIG. 8A: Side view of shelf system with of mounting clip in final position FIG. 8B: Enlargement of section in FIG. 8A FIG. 9A: Rear view of mounting clip with trapezoid shaped back part in final position in rail.

Figure 9B:
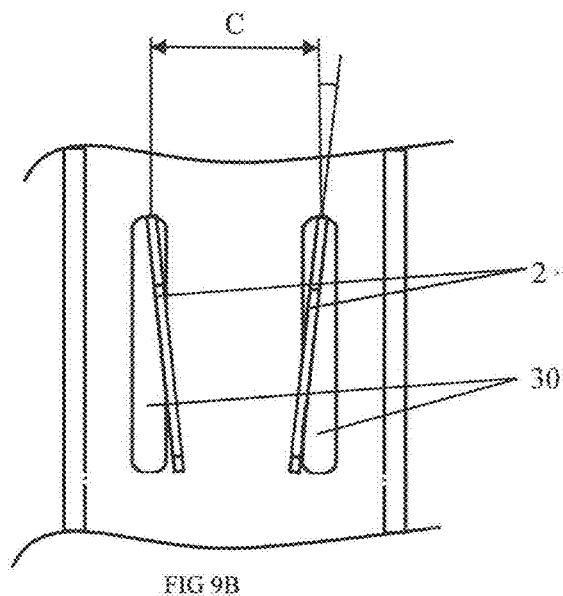

FIG. 9B: Rear view of mounting clip with alternative trapezoid shaped back part in final position in rail.

Figure 9C:
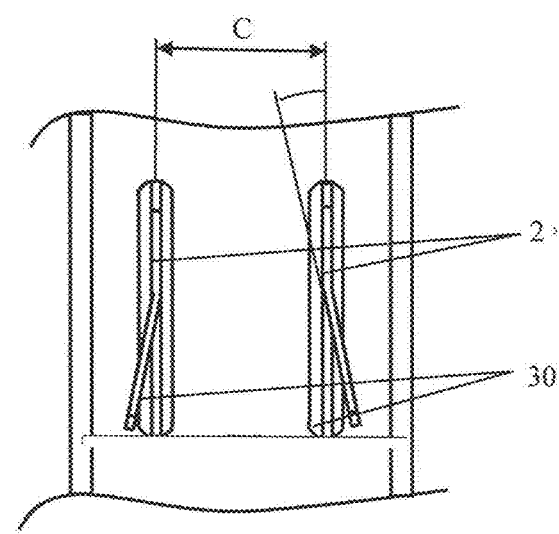

FIG. 9C: Rear view of mounting clip with alternative rectangular shaped back part in final position in rail.

Figure 10:
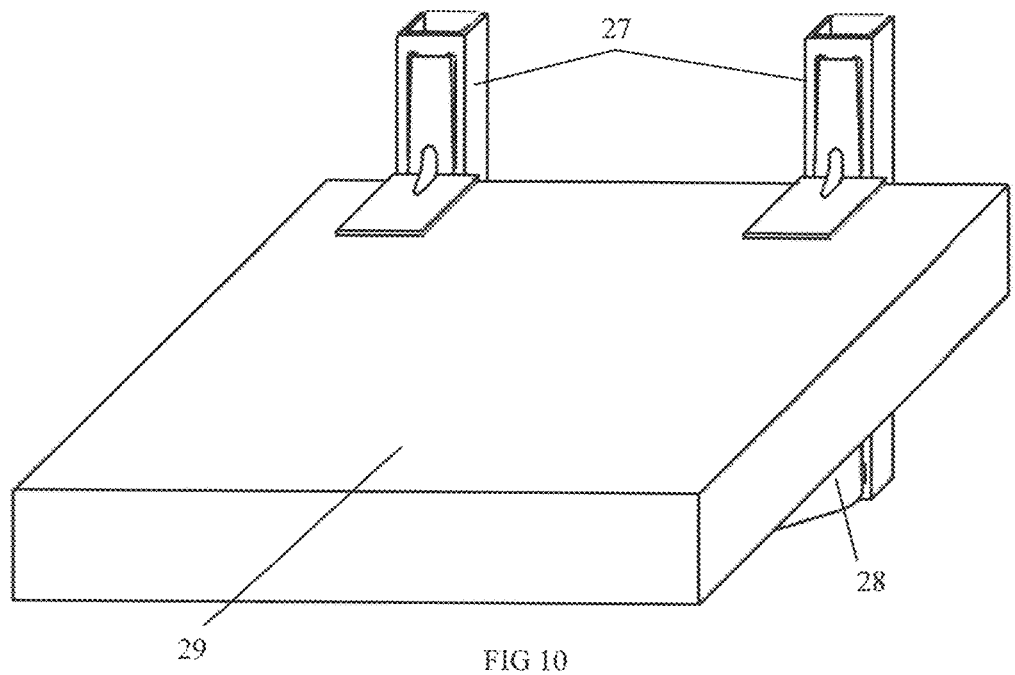

FIG. 10: Normal mounting with shelf fixating clips in a shelf system with two wall mounted rails FIG. 11: Rear section view

DETAILED DESCRIPTION OF THE INVENTION

The invention, mounting clip for adjustable shelf systems, contains a back part 1, back wings 2, base plate 3 and in preferred embodiment, a reinforcement 4 in the form of a bulge, which reinforces back part 1 and base plate 3, as shown in FIG. 1. The back wings 2 are joined with back part 1 from both side edges, forming an element with substantially U-shaped profile. Between back wings 2 and back part 1 bottom parts are opening slits 5, as shown in FIG. 1, which correspond to shelf rail tube wall thickness on which the mounting clip is mounted. In a preferred embodiment, the opening slit has a wider width at the bottom than the width at the top. The width of the slit at the bottom shall always be larger than the rail tube wall thickness and the width at the top of the slit is same or smaller than the smallest thickness of the wall band to be expected. This is to secure no gap is left due to tolerances of the rail thickness while mounting.

Figure 2A:
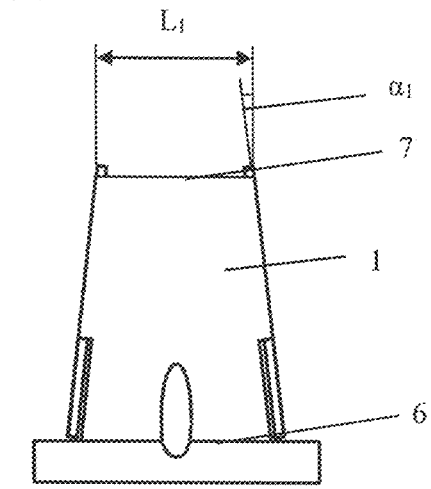
Figure 2B:
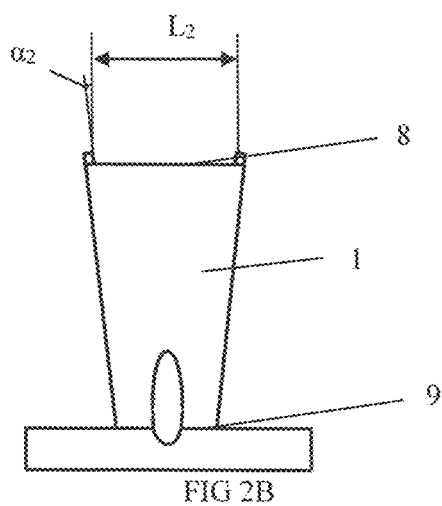
Figure 2C:
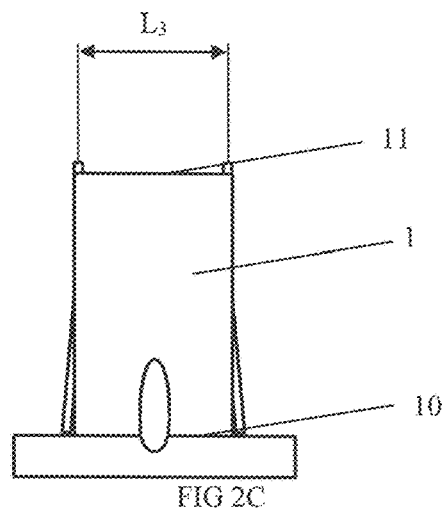
Figure 3:
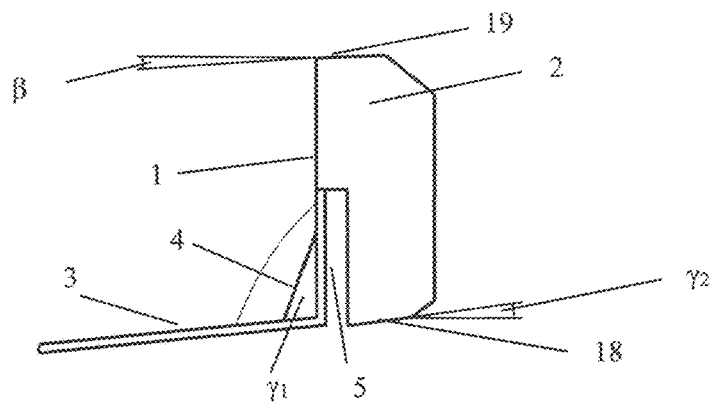

In alternative solutions, the back part 1 has trapezoid shape. In another alternative solution, back part 1 has rectangular shape, as shown in FIGS. 2A, 2B and 2C. The back part 1 on FIG. 2A has a wider base 6 than top 7 creating a width of the base 6 with wings that is wider than the outer parameter of the opening slots of the rail, while on FIG. 2B, the back part has a wider top 8 compared to the base 9 creating a width of the base 9 with wings is narrower than the inner parameter of the opening slots of the rail. In FIG. 2C, back part 1 has an equal width resulting in a similar width at base 10 and top 11 with wings bent inwards or outwards creating a width of the base with wings is wider/narrower than the inner parameter of the opening slots of the rail. The difference between the top and base dimensions 6-7, 8-9 and 10-11 of the back part 1 creates an angle that determines the angle of the back wings 12, 13 and 14. The width of the back part top 15, 16 and 17 is equal in different provided embodiments. The back wings 2 typically consist of a bottom bevel 18 and top bevel 19 as shown in FIG. 3. Between the back part 1 and base plate 3 is an obtuse angle, when the mounting clip is not mounted. In unmounted position, the back wings 2 top front angle 20 and back wings 2 lower parts angles 21 are similar to the angle 22 of the base plate 3 towards the horizontal plane. The flexible area between the base plate 3 and the back part 1 is created by the slit 5 in back wings 2. The rigidity of the flexible area is mainly determined by the length of the slit 5, the thickness of the material and width of the base 6, 9, 10, but also by existence of a bulge. Another flexible area is on the lower part of the back wings 2 that will flex when entering the opening slit in the rail (not shown on drawings).

Figure 4A:
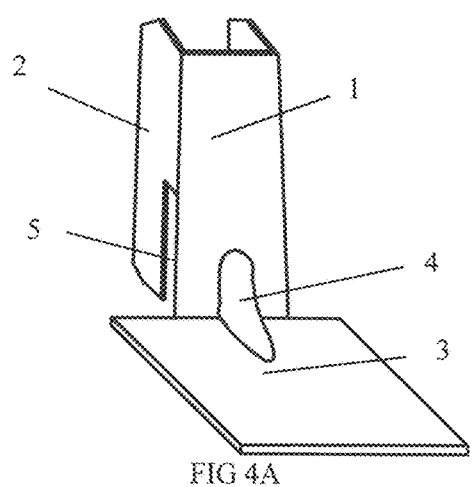
Figure 4B:
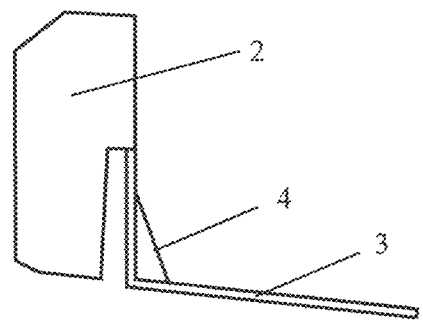

The bulge 4 increases the strength for resisting the bending of the base plate 3 upwards, as shown in FIGS. 4A and 4B. It is understood that the size of the bulge 4 determines the force that the base plate 3 resists. The bulge 4, however, made with excessive influence, provides the possibility to pack and store objects of the adjustable shelf.

Figure 5A:
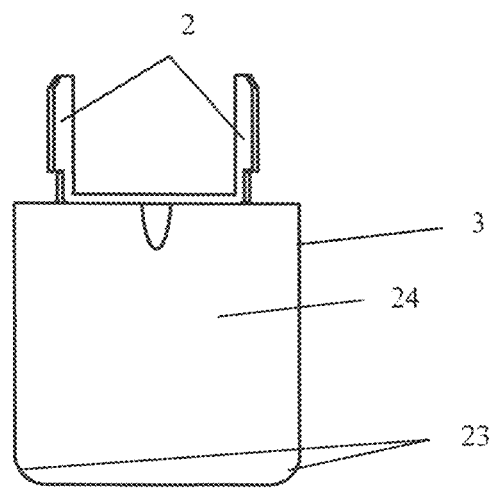
Figure 5B:
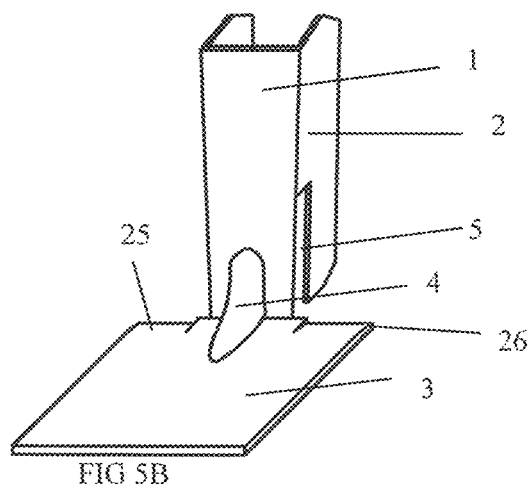

According to FIGS. 5A and 5B, in another alternative solution, the base plate 3 has rounded edges 23 in front to reduce the risk of interference with objects placed in the shelf. The bottom side 24 of the base plate 3 has a high friction material added on all over or in alternative solutions on parts of the surface. The high friction material is typically a rubber material or similar that has a friction coefficient. The high friction material typically has an adhesive on the backside that is permanently fixated to the bottom side 24 of the base plate 3. The friction material may also have a surface structure that increases the friction even more. The high friction material together with the force applied through the base plate 3 origin from the clip being snapped in its final position prevents the shelf board from being moved sideways or forward. Alternatively, the friction is created through having parts of the base plate 3 bent downwards 25 for creating a sharp edge 26.

FIG. 6A shows a mounting clip in an unmounted position. The angle between the base plate 3 and the back part 1 is larger than 90 degrees. FIG. 6B shows the mounting clip in its final mounted position having an angle equal to 90 degrees between the base plate 3 and the back part 1.

The initial state of mounting process of the mounting clip on a shelf system, which consists of a rail 27, bracket 28 and shelf board 29 is shown on FIGS. 7A and 7B, where FIG. 7B is an enlargement of the specified area A of FIG. 7A. The mounting of the mounting clip is done by positioning the mounting clip in the opening slots 30 of the rails 27. The mounting clip will automatically be in backward tilted position when positioned on the shelf board 29 as the angle between base plate 3 and back part 1 is larger than 90 degrees. The height 31 of the mounting clip in its backward tilted position is smaller than the distance 32 between the shelf board 29 and the upper perimeter 33 of the opening slot 30 of the rail 27. FIGS. 8A and 8B, where FIG. 8B is an enlargement of the specified area B of FIG. 8A, displays the final positioning of the mounting clip into the opening slot 30 of the rail 27. In final position, the angle between back part 1 and base plate 3 is equal to 90 degrees. The height 33 of the mounting clip in its final mounting is larger than the distance 32 between the shelf board 29 and the upper perimeter 31 of the opening slot 30 in the rail 27.

FIG. 9A shows the described embodiment, as shown on FIG. 2A, of the mounting clip in mounted position, where the upper part of the back wings 2 and the opening slots 30 of the rail are in the same centre to centre measurement 35. The flexible parts of the back wings are bent inwards during the mounting, when guided by the outer side parameters of the opening slots 30 in rail 27 until the slit 5 (not shown on a figure) in the back wings passes through to opening slots 30 in the rail 27 where the flexible part of the back wings snaps back to its relaxed original position.

FIG. 9B shows the described embodiment, as shown on FIG. 2B, which has the upper part of the back wing 2 and the opening slots 30 of the rail 27 in the same centre to centre measurement 36. The flexible parts of the back wings are bent outwards during the mounting, when being guided by the outer side parameters of the opening slots 30 in rail 27 until the slit 5 in the back wings as shown in FIG. 9 in flexible part of the back wings 2, passes through to opening slots 30 where the flexible part snaps back to it at relaxed original position.

FIG. 9C shows the described embodiment, as shown on FIG. 2C, which has the upper part of the back wing 2 and the opening slots 30 of the rail 27 in the same centre to centre measurement 37. The flexible part of the back wings are bent outwards or inwards during the mounting, dependent on the original relaxed positioning of the flexible wings, being guided by the inner side parameter or outer side parameters of the opening slots 30 in rail 27 until the slit 5 in the back wings of FIG. 9 passes through to opening, where the flexible part snaps back to it in relaxed original position.

FIG. 10 shows a mounted shelf system including the mounting clip with two rails 27 ready for use. The shelf board 29 is supported by the brackets 28. The number of rails 27 needed can be multiple and is dependent on the length of the shelf board 29.

Figure 11:
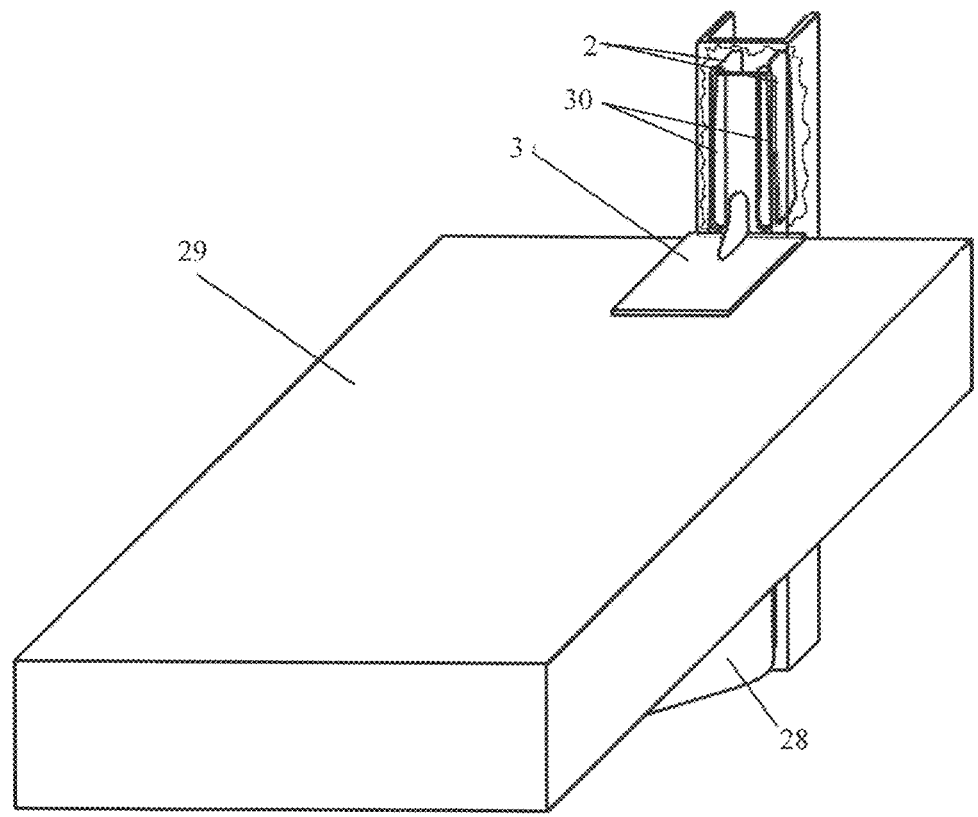

FIG. 11 shows the mounting clip as it is positioned into the opening slots 30 in the rail 27 and there through positioned and locked for downward and sideway movements. The mounting clip is locked towards upward forces, which are applied on the shelf board 29 by the upper part of the clip back wings 2 towards the top of the rail opening slots 30 and forward by the upper bevelled front part of the back wings 2 towards the top of the rail opening slots 30 and locking, with snap, of the back wings 2 towards the rail 27. The locking sideways and forward between the mounting clip and the shelf board 29 is done through friction between the base plate 3 and the shelf board 29 surface.

Overview of the Shelf System Mounting Procedure

After the shelf board is placed on the bracket, which is positioned at the right height in the rail, the mounting clip is fixed. The adjustable mounting clip is mounted through positioning its' back wings in the slots of the rail and by pushing it inwards in locking position. The adjustable mounting clip automatically locks its position between the shelf board and upper part of the rail slot. The upper part of the clip, which enters the slot, has an angle to secure fastening and the lower flat part of the clip has an angle to ease the mounting of the clip and for applying a spring force to the shelf board. The locking between the clip and the shelf board is obtained, separate or in combination, either through having the edges on the flat part closest to the rail bent in a reversed angle compared to the remaining flat surface creating a sharp edge to the shelf board or through applying a high friction material on the flat surface.

In alternative embodiment, the locking between the clip and the rail is obtained through positioning of the upper part of the backward facing clips in the upper part of the opening of the rails. The backwards facing wings have an angle facing either inwards or outwards leading to a bending of the wings as the clip is placed in position. When the clip reaches its final position, the wings will pass through the opening and create a snap in fixation.

Removing of the clip is most easily done through placing a sharp instrument like a table knife or a screwdriver on the upper part between the rail and the clip and by tilting the clip gently forward.

The invention claimed is:

1. A mounting clip for adjustable shelf systems having a shelf rail tube (27) with opening slots (30) and a wall thickness on which the mounting clip is mountable, comprising:

the self rail tube (27), a back part (1) having a lower part and an upper part, a lower edge located on a base (6) of the lower part, an upper edge located on a top (7) of the upper part, and a first edge opposite a second edge, the first and second edges extending vertically upward from the lower edge of the lower part to the upper edge of the upper part of the back part (1);

a base plate (3) connected to the base (6) of the lower part of the back part (1) and extending outward, away from the back part (1); and back wings (2), an upper part of a first of the back wings (2) being joined to an upper part of the first edge of the back part (1) and an upper part of a second of the back wings being joined to an upper part of the second edge of the back part (1), the upper parts of the first and second back wings (2) and the upper of the back part (1) together in cross-section forming a substantially U shape profile, wherein i) a lower part of the first of the back wings (2) is spaced apart from a lower part of the first edge of the back part (1) thereby forming a first slit (5) between the lower part of the back part (1) and the lower part of the first of the back wings (2) and ii) a lower part of a second of the back wings (2) is spaced apart from a lower part of the second edge of the back part (1) thereby forming a second slit (5) between the lower part of the back part (1) and the lower part of the second of the back wings (2), wherein each of the first and second slits (5) have a height extending along a corresponding one of the lower parts of the first and second edges and a width, the width of each of the first and second slits (5) being greater than the wall thickness of the rail tube at least at a part of the first and second slits (5), and wherein each of the lower part of the first and second back wings is flexible to allow, during mounting of the clip into the opening slots of the shelf rail tube, the lower part of the first and second back wings to bend from an unmounted first, relaxed separation distance to a second distance during the mounting with the first and second back wings passing through the opening slots, and then snap-return to the first relaxed separation distance when the clip is mounted and locked in a snap in fixation to the shelf rail tube.

2. The mounting clip for adjustable shelf systems according to claim 1, wherein the mounting clip further comprises a reinforcement (4) which reinforces back part (1) and base plate (3), the reinforcement (4) extending from the back part (1) to the base plate (3) and increasing a strength for resisting bending of the base plate (3) upwards towards the back part (1).

3. The mounting clip for adjustable shelf systems according to claim 2, wherein the reinforcement (4) is in the form of a bulge.

4. The mounting clip according to claim 1 in combination with an adjustable shelf system, wherein the adjustable shelf system comprises a shelf rail tube and a shelf board, the shelf rail tube having opening slots and a wall thickness, the shelf board having a shelf board thickness, and wherein a height of the mounting clip allows insertion of an upper part of the first and second back wings (2) into the opening slots followed by insertion of the lower part of the first and second back wings into the opening slots so that, the lower part of the first and second back wings bend from the unmounted first, relaxed separation distance to the second distance during the mounting and then snap-return to the first relaxed separation distance with the first and second wings having passed through the opening slots and creating the snap in fixation of the clip locked to the shelf rail tube.

5. The mounting clip for adjustable shelf systems according to claim 1, wherein,
the base (6) of the back part (1) is wider than the top (7) of the back part (1) and has trapezoid shape, and
the relaxed separation distance between the lower part of the first and second back wings increases from a top of the first and second slits (5) towards a bottom of the first and second slits (5), and
wherein each of the lower part of the first and second back wings, during mounting of the clip into the opening slots of the shelf rail tube, the lower part of the first and second back wings to bend towards each of from the unmounted first, relaxed separation distance to the second distance during the mounting and then snap-return outwards away from each other to the relaxed separation distance when the clip is mounted and locked in the snap in fixation to the shelf rail tube.

6. The mounting clip for adjustable shelf systems according to claim 1, wherein,
the top of the back part (1) is wider than the base (10) of the back part (1) and has trapezoid shape,
the relaxed separation distance between the lower part of the first and second back wings decreases from a top of the first and second slits (5) towards a bottom of the first and second slits (5), and
wherein each of the lower part of the first and second back wings, during mounting of the clip into the opening slots of the shelf rail tube, the lower part of the first and second back wings to bend away each of from the unmounted first, relaxed separation distance to the second distance during the mounting and then snap-return inwards away from each other to the relaxed separation distance when the clip is mounted and locked in the snap in fixation to the shelf rail tube.

7. The mounting clip for adjustable shelf systems according to claim 1, wherein,
the back part (1) has rectangular shape, and
the relaxed separation distance between the lower part of the first and second back wings changes from a top of the first and second slits (5) towards a bottom of the first and second slits (5).

8. The mounting clip for adjustable shelf systems according to claim 4, in combination with the adjustable shelf system, wherein in unmounted position between the back part (1) and base plate (3) is an obtuse angle.

9. The mounting clip for adjustable shelf systems according to claim 8, in combination with the adjustable shelf system, wherein in a mounted position, between the back part (1) and base plate (3) is an angle of 90 degrees.

10. The mounting clip for adjustable shelf systems according to claim 1, wherein between the base plate (3) and the back part (1) is a flexible area.

11. The mounting clip for adjustable shelf systems according to claim 10,
wherein the mounting clip further comprises a reinforcement (4), which reinforces back part (1) and base plate (3), the reinforcement (4) extending from the back part (1) to the base plate (3) and increasing a strength for resisting bending of the base plate (3) upwards towards the back part (1), the reinforcement (4) being in the form of a bulge, and
wherein a length of the first and second slits (5), a thickness of a material that comprises the back part, a width of the base plate (6, 9, 10) and the bulge provide a rigidity to the flexible area.

12. The mounting clip for adjustable shelf systems according to claim 10, in combination with an adjustable shelf system,
wherein the adjustable shelf system comprises a shelf rail tube and a shelf board, the shelf rail tube having opening slots and a wall thickness, the shelf board having a shelf board thickness, and
wherein a width of the base plate (3) is wider than an outer parameter of the opening slots of the rail tube.

13. The mounting clip for adjustable shelf systems according to claim 10, in combination with an adjustable shelf system,
wherein the adjustable shelf system comprises a shelf rail tube and a shelf board, the shelf rail tube having opening slots and a wall thickness, the shelf board having a shelf board thickness, and
wherein a width of the base plate (3) is narrower than the inner parameter of the opening slots of the rail tube.

14. The mounting clip for adjustable shelf systems according to claim 1, wherein the first and second slits (5) on back part wings has an angle creating a bigger opening at a bottom of each of the first and second slits (5) and going to a narrower opening at a top of each of the first and second slits (5).

15. The mounting clip for adjustable shelf systems according to claim 1, wherein the base plate (3) has corners with sides that define acute angles.

16. The mounting clip for adjustable shelf systems according to claim 1, wherein the base plate (3) has rounded corners.

17. The mounting clip for adjustable shelf systems according to claim 1, wherein the base plate (3) has a high friction material added on all over a surface thereof.

18. The mounting clip for adjustable shelf systems according to claim 1, wherein a lower surface of the base plate (3) has a high friction material.

19. The mounting clip for adjustable shelf systems according to claim 1,
wherein the first and second slits (5) have a wider width at a bottom thereof than a width at the top thereof and
wherein the bottom width of the first and second slits (5) is larger than the wall thickness of the rail tube and the top width of the first and second slits (5) is the same as a smallest wall rail tube.

20. The mounting clip for adjustable shelf systems according to claim 1,
wherein the first and second slits (5) have a wider width at a bottom thereof than a width at the top thereof and
wherein the bottom width of the first and second slits (5) is larger than the wall thickness of the rail tube and the top width of the first and second slits (5) is smaller than a smallest wall thickness of the rail tube.

* * * * *